(12) United States Patent
Ash et al.

(10) Patent No.: US 10,359,069 B2
(45) Date of Patent: Jul. 23, 2019

(54) BRACKET MOUNT FOR SECURING SOLAR PANEL RAIL GUIDES ON SHINGLE ROOFS

(71) Applicant: Ironridge, Inc., Hayward, CA (US)

(72) Inventors: Jon Ash, Phoenix, AZ (US); Shawn Meine, Phoenix, AZ (US); Anumeha Narain, Paradise Valley, AZ (US); Clayton Reitz, Phoenix, AZ (US); David Taggart, San Carlos, CA (US)

(73) Assignee: IronRidge, Inc., Hayward, CA (US)

( * ) Notice: Subject to any disclaimer, the term of this patent is extended or adjusted under 35 U.S.C. 154(b) by 0 days.

(21) Appl. No.: 15/550,018

(22) PCT Filed: Jul. 29, 2016

(86) PCT No.: PCT/US2016/044836
§ 371 (c)(1),
(2) Date: Aug. 9, 2017

(87) PCT Pub. No.: WO2017/019999
PCT Pub. Date: Feb. 2, 2017

(65) Prior Publication Data
US 2018/0106289 A1    Apr. 19, 2018

Related U.S. Application Data

(60) Provisional application No. 62/198,647, filed on Jul. 29, 2015.

(51) Int. Cl.
*F16B 39/28* (2006.01)
*F16B 39/284* (2006.01)
(Continued)

(52) U.S. Cl.
CPC ............ *F16B 39/284* (2013.01); *F16B 9/026* (2013.01); *F16B 39/34* (2013.01); *F24S 25/613* (2018.05);
(Continued)

(58) Field of Classification Search
CPC .............. H02S 20/23; F24S 2025/6005; F24S 2025/6006; F24S 25/615; F24S 25/613;
(Continued)

(56) References Cited

U.S. PATENT DOCUMENTS 6,010,289 A * 1/2000 DiStasio ............... C07C 213/10
411/174
6,360,491 B1   3/2002 Ullman
(Continued)

FOREIGN PATENT DOCUMENTS

DE      202012103903 U1    12/2012

*Primary Examiner* — Adriana Figueroa
(74) *Attorney, Agent, or Firm* — Lance C. Venable; Law Office of Lance C. Venable, PLLC

(57) ABSTRACT

In various representative aspects, an assembly for securing a solar panel rail and rail-less support structures to a shingle roof. More specifically, the apparatus includes a connection bracket and flashing device for use in installing solar panel rail support structures. The connection bracket is secured to the flashing device by rotating its base around a threaded connection until it locks in place so that a solar panel rail support guide can be connected to a generally U-shaped connection on the top of the bracket. The apparatus also offers an improved means to cover the penetration point on the flashing to protect it and prevent water from leaking into the roof as well as an improved way to install the apparatus over existing products. An alternate embodiment of the apparatus is offered to support a rail-less pivot mount as well.

9 Claims, 21 Drawing Sheets

(51) Int. Cl.
*H02S 20/23* (2014.01)
*F16B 9/02* (2006.01)
*F16B 39/34* (2006.01)
*F24S 25/615* (2018.01)
*F24S 25/613* (2018.01)
*F24S 25/60* (2018.01)
*F24S 80/00* (2018.01)

(52) U.S. Cl.
CPC ............ *F24S 25/615* (2018.05); *H02S 20/23* (2014.12); *F24S 80/00* (2018.05); *F24S 2025/6005* (2018.05); *F24S 2025/6006* (2018.05); *Y02B 10/12* (2013.01); *Y02B 10/20* (2013.01); *Y02E 10/47* (2013.01)

(58) Field of Classification Search
CPC ........ F24S 80/00; Y02E 10/47; F16B 39/284; F16B 39/34; F16B 9/026; Y02B 10/20; Y02B 10/12
See application file for complete search history.

(56) References Cited

U.S. PATENT DOCUMENTS

| | | | |
|---|---|---|---|
| 8,122,648 B1 * | 2/2012 | Liu | F24S 25/61 52/58 |
| 8,245,460 B2 * | 8/2012 | Yamanaka | H02S 20/23 52/173.3 |
| 8,250,829 B2 | 8/2012 | McPheeters et al. | |
| 8,272,174 B2 | 9/2012 | Stearns et al. | |
| 8,448,405 B2 | 5/2013 | Schaefer et al. | |
| 8,539,719 B2 | 9/2013 | McPheeters et al. | |
| 8,689,517 B2 | 4/2014 | Schaefer et al. | |
| 8,707,654 B2 | 4/2014 | Schaefer et al. | |
| 8,707,655 B2 | 4/2014 | Schaefer et al. | |
| 8,739,471 B2 | 6/2014 | McPheeters et al. | |
| 8,752,338 B2 | 6/2014 | Schaefer et al. | |
| 8,756,881 B2 * | 6/2014 | West | E04B 1/38 52/173.3 |
| 8,833,032 B2 | 9/2014 | Schaefer et al. | |
| 8,869,490 B2 | 10/2014 | Schaefer et al. | |
| 8,991,765 B1 | 3/2015 | Chesser et al. | |
| 9,068,339 B2 | 6/2015 | Schaefer et al. | |
| 9,134,044 B2 * | 9/2015 | Stearns | E04D 3/36 |
| 2008/0000173 A1 * | 1/2008 | Lenox | F24J 2/5245 52/173.1 |
| 2011/0233358 A1 | 9/2011 | McPheeters et al. | |
| 2012/0144760 A1 * | 6/2012 | Schaefer | E04C 3/06 52/58 |
| 2012/0222380 A1 | 9/2012 | Wentworth et al. | |
| 2013/0091787 A1 | 4/2013 | Puga | |
| 2015/0129517 A1 | 5/2015 | Wildes | |

* cited by examiner

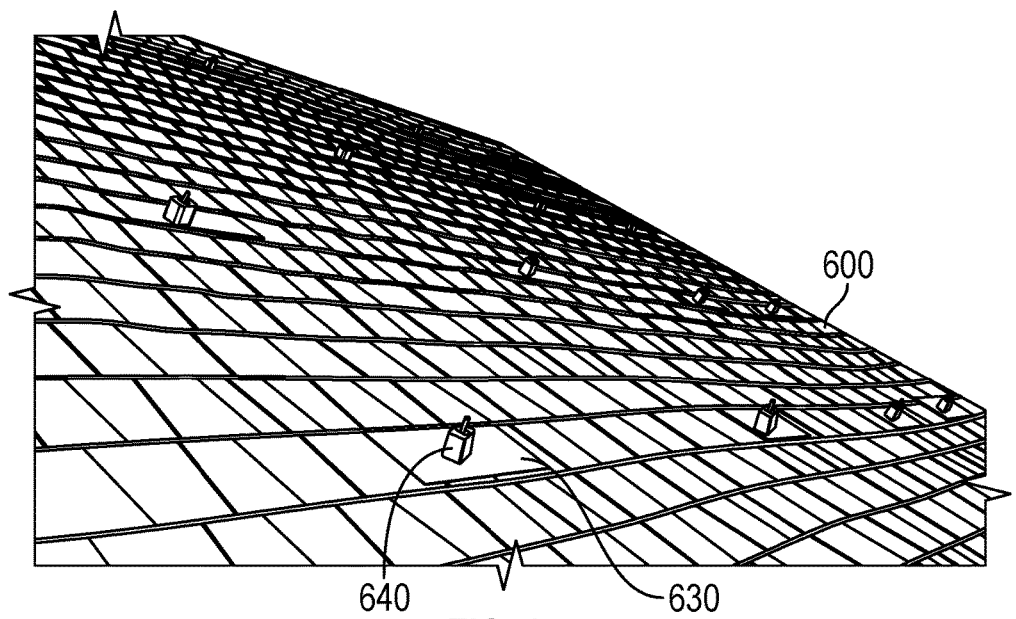
FIG. 1 - PRIOR ART
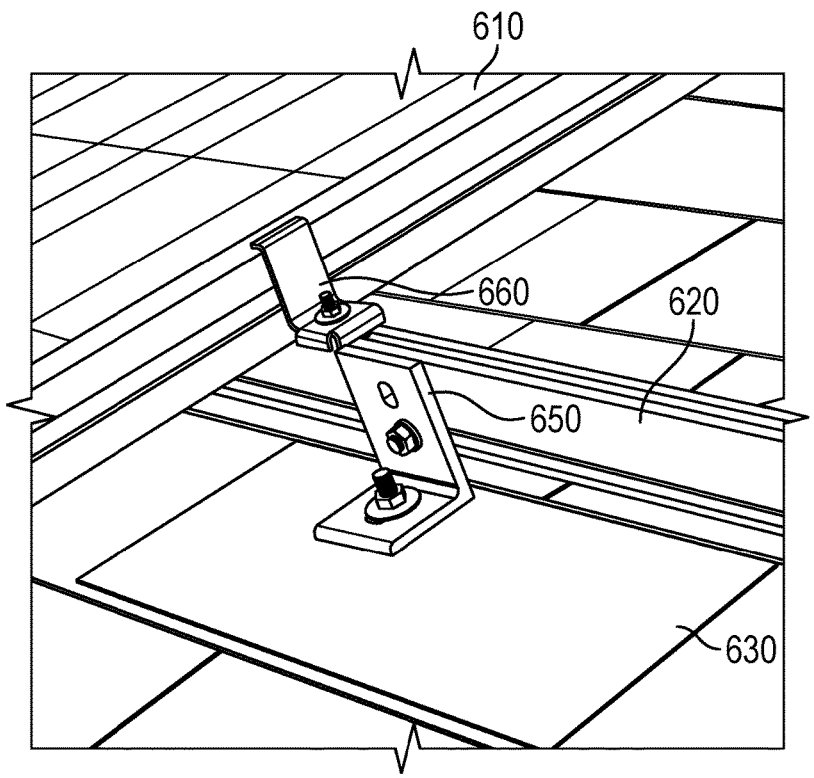
FIG. 2
PRIOR ART

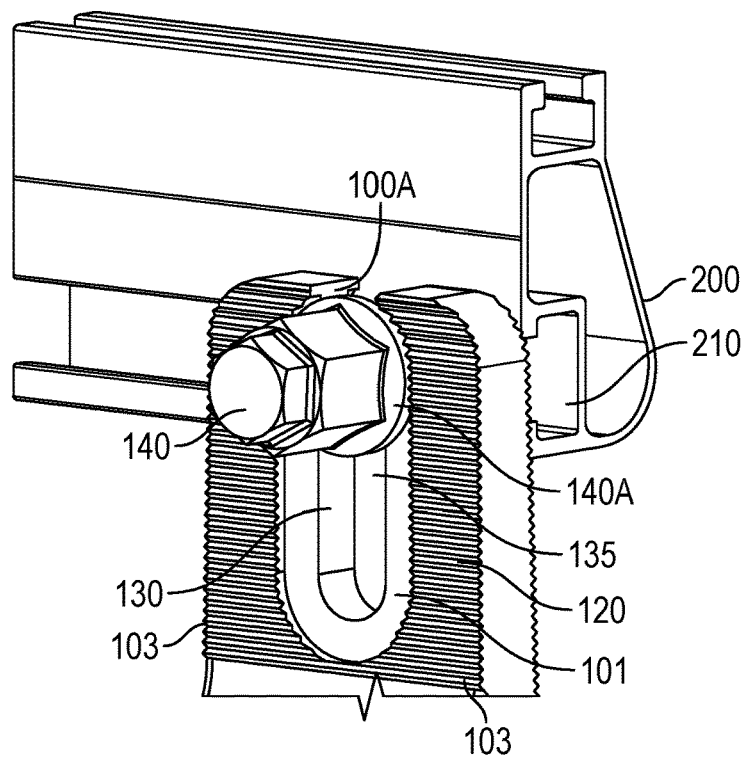
FIG. 5
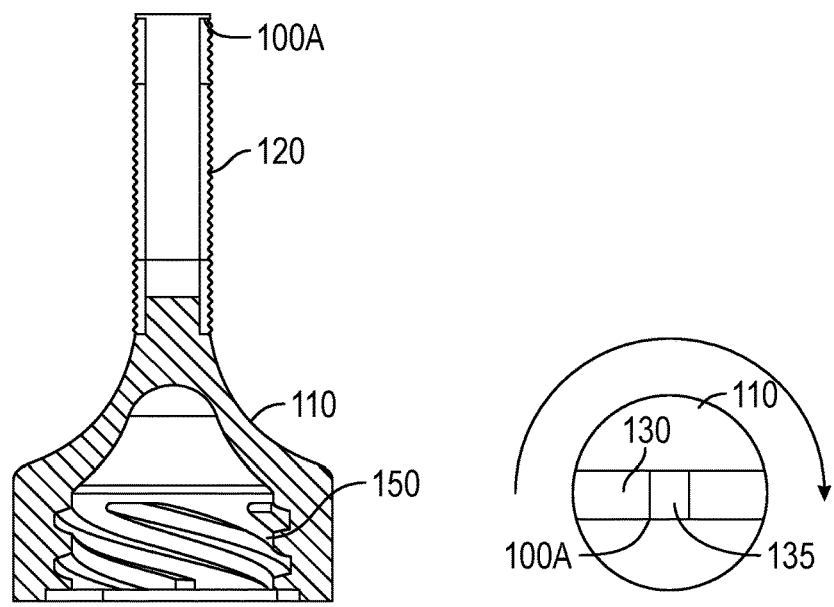
FIG. 6
FIG. 7

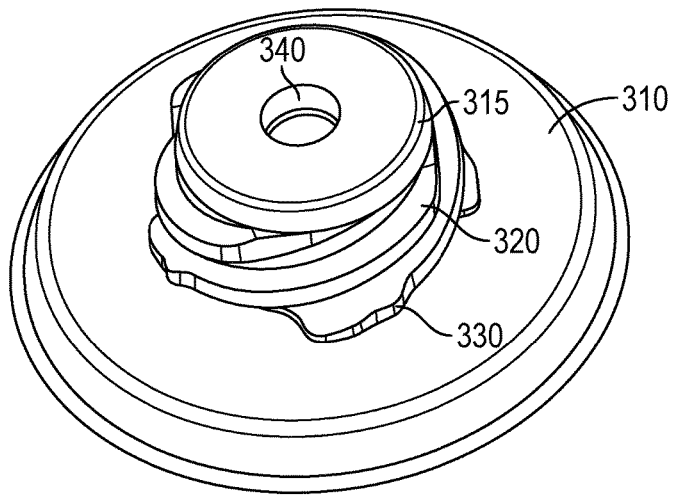
FIG. 8
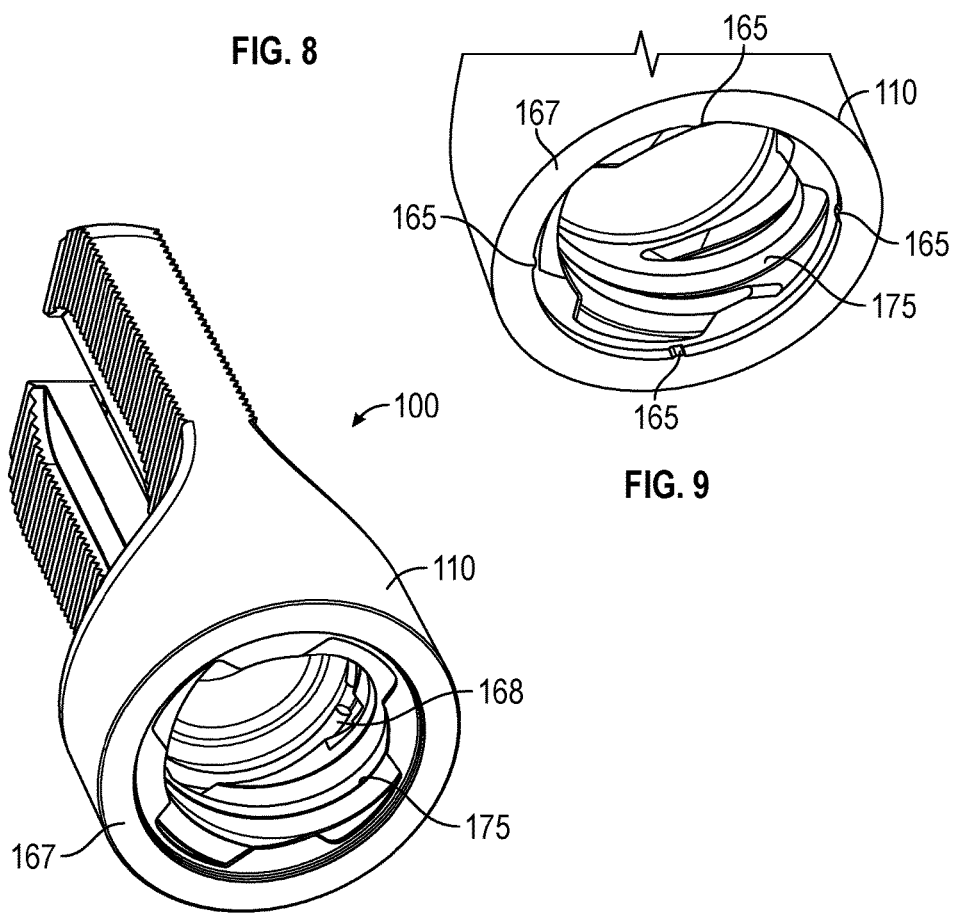
FIG. 9
FIG. 9A

Press

BRACKET MOUNT FOR SECURING SOLAR PANEL RAIL GUIDES ON SHINGLE ROOFS

BACKGROUND OF INVENTION

Field of the Invention

The present invention relates generally to an apparatus for securing a solar panel rail and rail-less support structures to a roof. More specifically, the apparatus provides a novel and improved connection bracket and flashing device for use in installing solar panel rail and rail-less support structures. The apparatus is an improvement over the traditional L-foot brackets that are typically used as the connecting point to secure the solar panel rail structure. The apparatus also offers an improved means to cover the penetration point on the flashing to protect it and prevent water from leaking into the roof as well as an improved way to install the apparatus over existing products. An alternate embodiment of the apparatus is offered to support a rail-less pivot mount as well.

Description of the Related Art

Any discussion of the prior art in the specification should in no way be considered as an admission that the prior art is widely known or forms part of common general knowledge in the field.

The installation of solar panel arrays on residential roofs can be arduous and time-consuming. Depending on the array design, the components required to install the array can make the installation process even more difficult. Many of the assembly components require special tools or are generally difficult to install because they are utilized after the solar panels modules are arranged or positioned on their support elements. This is particularly true when the elements must be installed on a standard shingle roof that links to a rail guide for supporting the solar panel array.

Existing processes that are employed to mount solar panel rail guides on shingle roofs utilize L-Foot connection brackets. A typical flashed shingle mount is shown in FIG. 2. These shingle mounts have been secured to the rafters of the roof and spaced apart for subsequent installation of solar panel rail guides. Once secured, an L-Foot bracket is then secured through a flashing on each individual shingle mount and a solar panel rail guide is then installed lengthwise and to each L-Foot bracket as shown below. Some mounts provide a standoff receiver 640 as shown in FIGS. 1 and 3 that elevate the roof penetration point above the roof to prevent water damage and leaks.

An improved bracket is desired for use in attaching the solar panel rail guides that overcomes the limitations of a typical L-Foot bracket. A bracket that covers the penetration point of the shingle mount to protect it from water leakage is also desired. And a symmetrical part is also desired to allow the bracket to be secured from multiple sides. An apparatus embodying these features is shown below.

An improved flashing receiver that supports both rail-based and rail-less pivot mounting structures that provides improved protection against leaks and is easier to install over existing solutions.

The present invention overcomes these limitations and offers a solution that provides a support mechanism for shingle roofs that is both easy to, install and use, which allows a rail-guide to be easily and precisely adjusted vertically along the support mechanism.

SUMMARY OF THE INVENTION

The invention is summarized below only for purposes of introducing embodiments of the invention. The ultimate scope of the invention is to be limited only to the claims that follow the specification.

It is an object of this invention to provide an apparatus for securing a solar panel rail guide structure to a shingle roof.

It is a further object of this invention that the apparatus comprises a bracket that is secured to a flashing.

It is a further object of this invention that the bracket comprises a base.

It is a further object of this invention that the bracket further comprises a guide that extends outward from the base.

It is a further object of this invention that the guide is a generally U-shaped configuration that forms an aperture.

It is a further object of the present invention to secure the rail guide to the guides with a nut and bolt.

It is a further object of this invention to provide a recessed path or slot that terminates at a lip on at least one end of the guide that prevents the nut from sliding out of the guide.

It is a further object of this invention to provide a recessed path that terminates at a lip on either side of the guide to enable installation of rail guides on either side of the bracket.

It is a further object of this invention that the surface of the guide further comprises a plurality of ridges to provide traction between the guide and the rail guide.

It is a further object of the present invention that the base is secured to a receiver on the flashing by utilizing an internal threaded connection between the receiver and the base.

It is a further object of this invention that the threaded connection includes a tactile snap that locks the base to the receiver when it is rotated a certain angular distance.

It is an object of this invention to provide an apparatus for securing a rail-less pivot mount structure to a shingle roof.

It is a further object of this invention that the apparatus comprises a sealed flashing with an attachment opening.

It is a further object of this invention that the sealing comprises a load distribution plate.

It is a further object of this invention that the base of the bracket is generally cylindrical in shape.

It is a further object of this invention that the sealing further comprises a fitting that extends upward from the rounded base.

It is a further object of this invention that the sealing is created by press fitting the flashing between the load distribution plate and fitting or receiver.

It is a further object of the present invention to secure a rail-less pivot mount to the sealing.

A person with ordinary skill in the relevant art would know that any shape or size of the elements described below may be adopted. Any combinations of suitable number, shape, and size of the elements described below may be used. Also, any materials suitable to achieve the object of the current invention may be chosen as well.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

FIG. 1 illustrates a top perspective view of a shingled roof with a sample of prior art flashing structures.

FIG. 2 illustrates a perspective view of a prior art flashing that is secured to a mounting bracket, which in turn is secured to a rail guide on the shingled roof shown in FIG. 1.

FIG. 5 illustrates a perspective view of the guides of the bracket secured to a typical solar panel rail guide using a nut and bolt.

FIG. 6 illustrates a side internal view of the bracket showing a female threading within the base of the bracket.

FIG. 7 illustrates a top view of the bracket shown in FIG. 4.

FIG. 8 illustrates a perspective view of the portion of the flashing that includes a male threading that receives the female threading of the base of the bracket.

FIG. 9 illustrates a bottom perspective view of the base showing the internal threads.

FIG. 9A illustrates an alternate embodiment of the internal threading and securing mechanism shown in FIG. 9.

DETAILED DESCRIPTION OF THE INVENTION

In the following description, and for the purposes of explanation, numerous specific details are provided to thoroughly understand the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed embodiments may be applied. The full scope of the invention is not limited to the example(s) that are described below.

Figure 3:
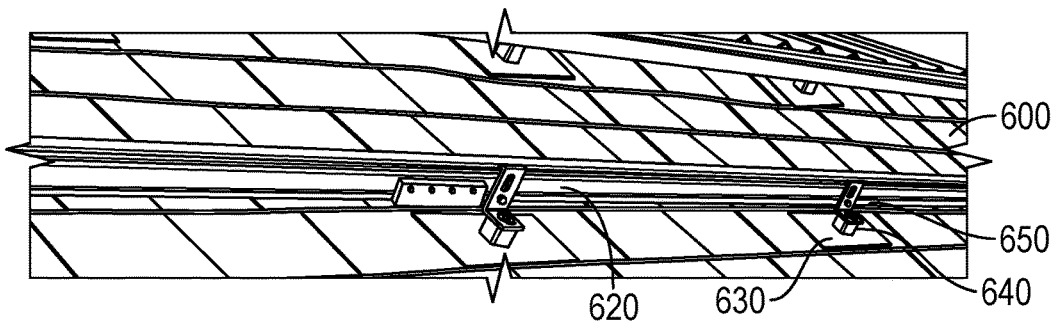
FIG. 3 illustrates a perspective view of the rail guide secured to multiple mounting brackets on multiple flashings on the shingled roof shown in FIG. 1.

FIGS. 1-3 illustrate a typical existing solar panel array structure. FIG. 1 shows a typical shingle roof 600 with several flashings 630 installed with a receiver 640. FIG. 2 illustrates how an L-shaped bracket 650 is secured directly to the flashing 630. FIG. 3 shows a front view of a rail-guide secured to multiple L-shaped brackets 650. The figure also includes examples of a receiver 640 can be utilized to raise the level of where the L-shaped bracket 650 interfaces with the flashing and the roof. The bracket 650 is then generally secured to a rail guide 620 by using a standard nut and bolt combination as shown, which is then used to support an end clamp 660. The end clamp 660 is then coupled to a solar panel module 610 as shown.

Figure 4:
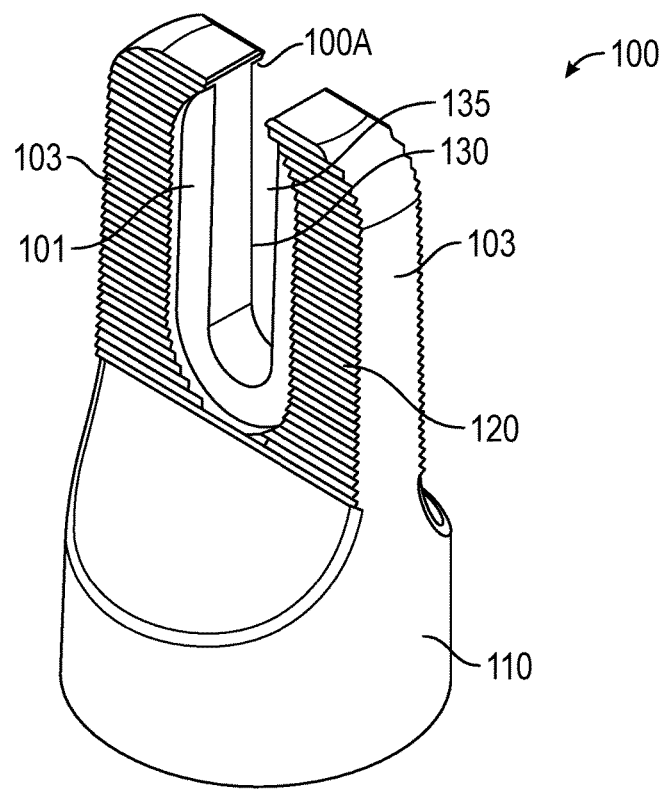
FIG. 4 illustrates a perspective view of an exemplary embodiment of a mounting bracket.

FIG. 4 shows an exemplary embodiment of the present invention that overcomes the limitations of the prior art. A mounting bracket 100 is shown. The mounting bracket 100 is an improvement over the L-shaped bracket shown in FIGS. 1-3. The bracket 100 has a base 110. A typical base is cylindrically shaped as shown, but the base 110 is not limited to a round shape. The base 110 tapers upward and forms a generally U-shaped guide 130 that forms a pair of members 103 extending from opposing sides of the base 110, which in turn forms an aperture 135. Aperture 135 also includes a recessed path 101 that terminates at a lip 100A. FIG. 5 shows how once a fastener such as nut and bolt 140 is dropped into the aperture 135, the path 101 allows the nut and bolt 140 to move along the path 101, but the lip 100A prevents the edge of the bolt 140A from slipping out of the aperture 135. Each side of the guide 130 also includes ridges 120.

FIG. 5 illustrates in greater detail how the bracket 100 is coupled to an alternate embodiment of a rail guide 200 similar to the support 620 shown in FIGS. 2 and 3. This particular rail guide 200 includes a bolt slot 210. The bracket 100 is typically coupled to the rail guide 200 by using the nut and bolt combination 140. The guide 130 allows the nut and bolt combination 140 to be inserted downward at the top of the open end of the aperture 135 between the nut and the rail support 200 with the nut already partially tightened as shown in FIG. 5. The symmetrical shape of the bracket 100 and the existence of a recessed path 101 and lip 100A on both sides of aperture 135 also allows the bracket 100 to be coupled to the rail-guide 210 from either side of the guide 130. The length of the aperture 135 allows the rail guide 200 to be adjusted at various heights. Other similar shapes can be used for the guide 130 such as one that is closed on all sides. A closed configuration, however, would require that the bolt be inserted through the aperture 135 prior to affixing the nut. The ridges 120 typically provide increased friction between the nut and the guide 130 to prevent the rail support 200 from slipping FIG. 6 shows a transparent side view of the base 110. A threaded link 150 is present in an internal or hollow opening of the base 110. The threaded link 150 is typically a female threaded portion that will be used to secure the base 110 to a receiver 315 to be discussed in FIG. 8. The threaded portion is not limited to a female threaded portion. It could also be a male threaded portion that fits to a female receiver, or it could also be another suitable connector like a bayonet-type of connector such as that shown in FIG. 6A. FIG. 7 shows a top view of the bracket 100 showing how the bracket 100 can be turned in the clockwise direction to secure it to the receiver 315 as shown in FIG. 8. This embodiment of the threaded link 150 shows a four-start thread that typically requires a 180-degree rotation for full installation. This simplifies installation and allows for multiple orientations of rail guides on the roof. Other similar thread configurations can also be used.

Figure 11:
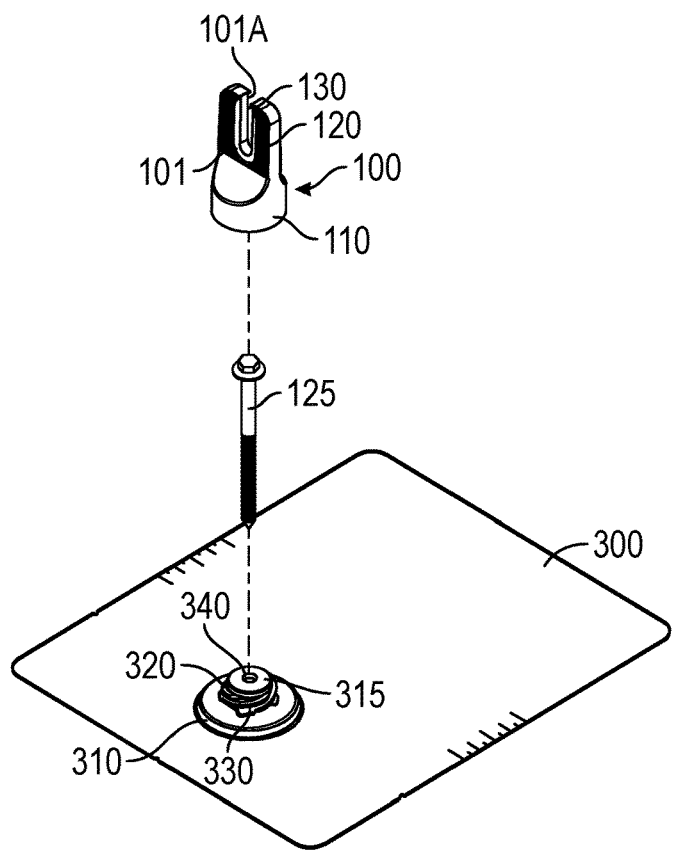
FIG. 11 illustrates an exploded perspective view of the bracket, sealed flashing, and a screw that is used to secure the flashing to the roof.

FIG. 8 shows an exemplary receiver 315. The receiver 315 is typically embedded or secured at a raised portion of the flashing 300 that forms a raised base 310 as shown in FIG. 11. The raised base 310 raises the level of the receiver 315 so that liquids or moisture will not accumulate where the receiver 315 is located. This elevates the roof penetration point above the roof's surface to prevent water damage and leakage. The receiver 315 also includes a threaded portion 320, a snap tab 330, and an opening 340. The threaded portion 320 preferably should include male threads that can be used to join the base 110 of the bracket 100 to the receiver 315. The snap tab 330 provides an exemplary means for providing an audible or tactile notification that the bracket 100 has been locked to the receiver 315.

FIG. 9 shows a perspective close-up internal view of the threaded link 150 of the base 110. Bumps 165 are present on the rim 167 of the base 110. FIG. 10 shows a similar view to that of FIG. 9. In FIG. 10, a view of a typical receiver 315 threaded portion 320 is fully inserted into the threaded link 150. This is typically accomplished by rotating the bracket 100 in a clockwise direction around the threaded portion 320 until it is locked in place. Prior to the bracket 100 being fully engaged with the receiver 315, the bumps 165 will engage the snap tabs 330 and then snap in place.

Figure 9B:
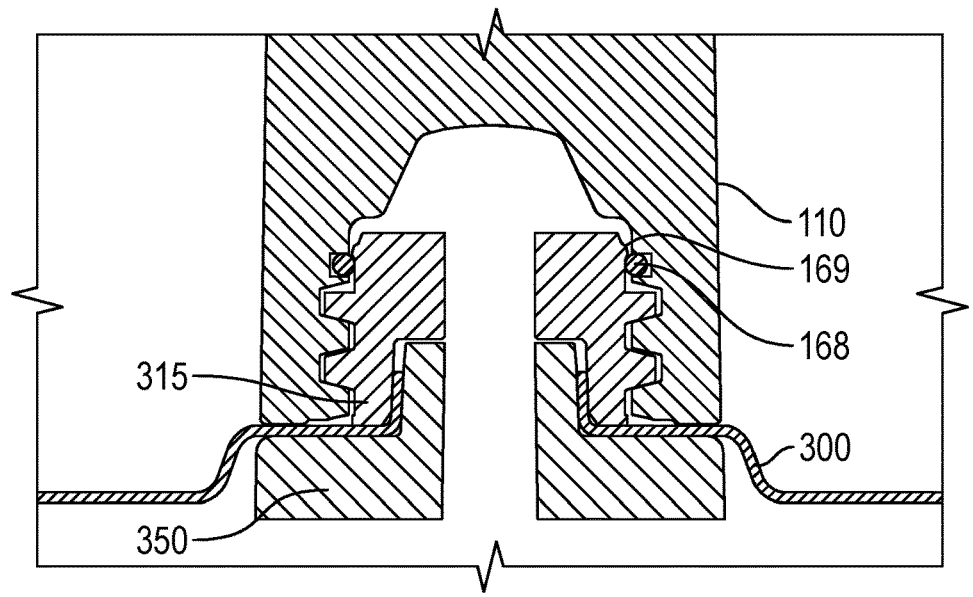
FIG. 9B illustrates a cross-sectional view of the embodiment shown in FIG. 9.
Figure 10:
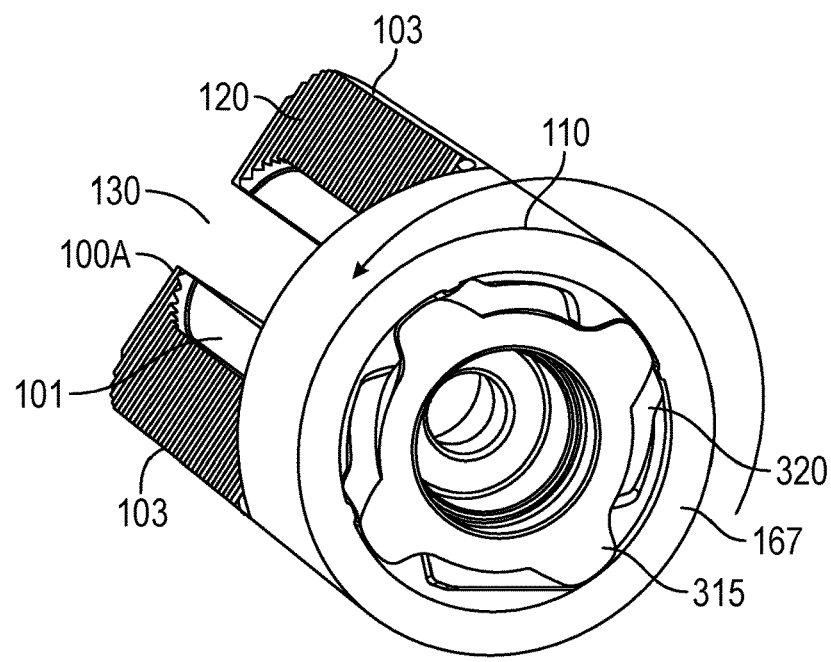
FIG. 10 illustrates a bottom perspective view showing the male threads of the receiver fully inserted into the female threads of the base.

FIG. 9A shows an alternate embodiment of the snap tabs 330 and bumps 165. A raised edge 168 inside the hollow opening of the base 110 engages and snaps over a protrusion 169 on the receiver 315. In this case, the raised edge 168 inside the base 110 as shown in FIG. 9B is a separate component such as a circlip, which is the ring-shaped portion shown in the figure. This combination provides a tactile or audible indication when the bracket 100 is properly coupled to the receiver 315.

Figure 12:
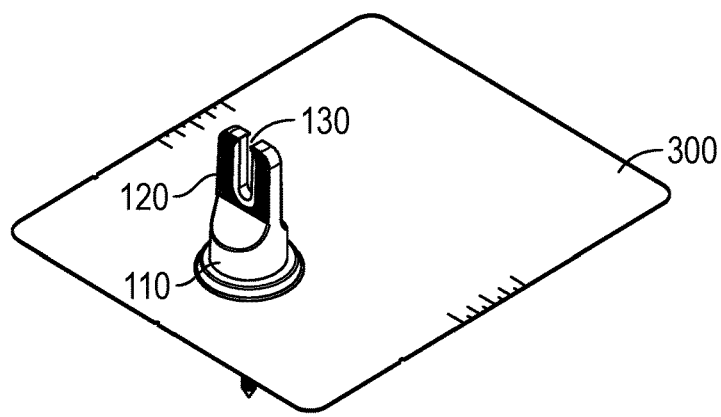
FIG. 12 illustrates a perspective view of the bracket fully assembled and secured to the flashing.
Figure 13:
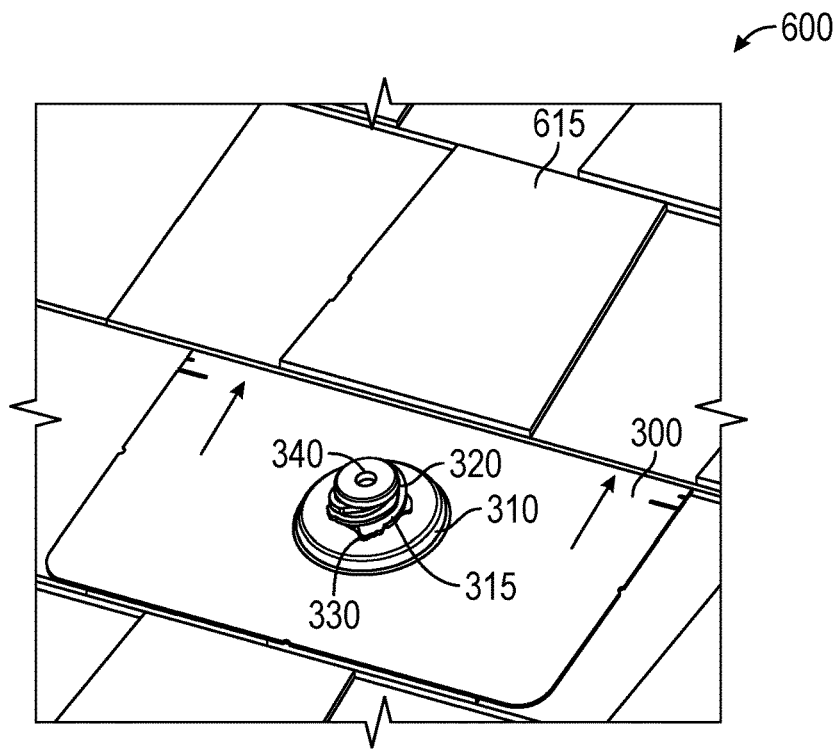
FIG. 13 illustrates a perspective view of the first step showing the flashing being inserted between the shingles of the roof.
Figure 14:
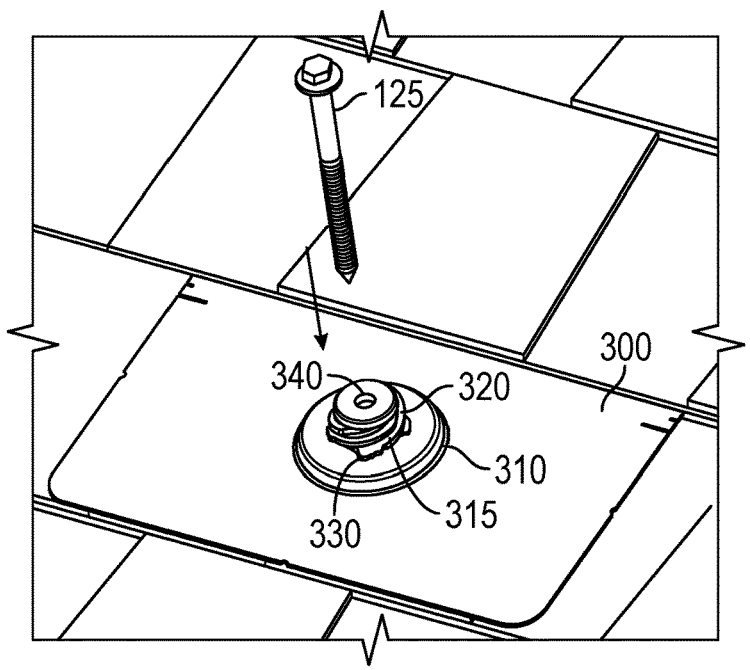
FIG. 14 illustrates a perspective view of the next step showing the screw with bonded washer being inserted into the flashing to secure it to the roof.
Figure 15:
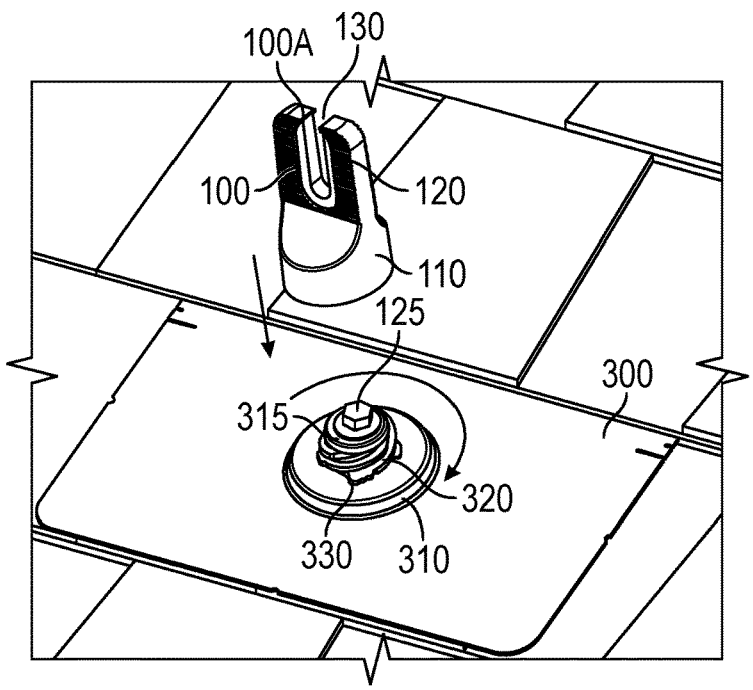
FIG. 15 illustrates a perspective view of the next step showing the bracket being lowered onto the flashing and turned in a clockwise direction along the threads to secure the bracket to the sealed flashing.
Figure 16:
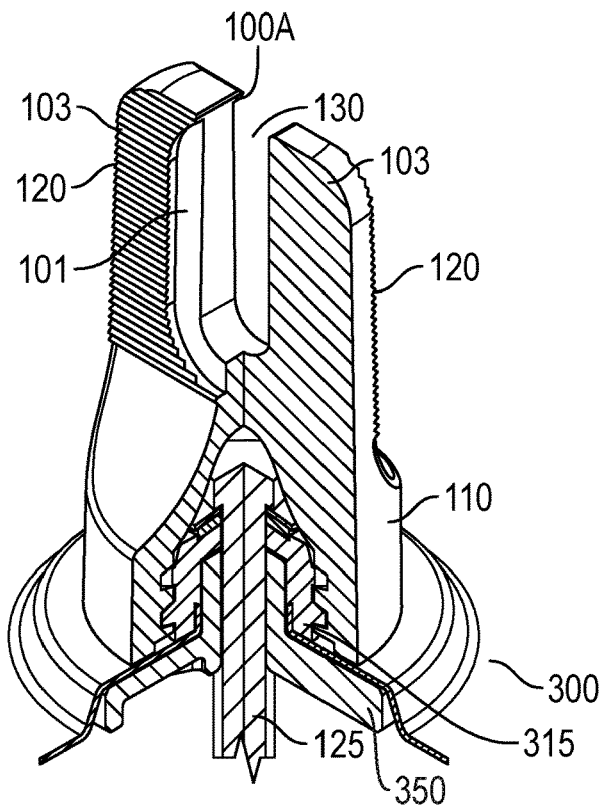
FIG. 16 illustrates a cross-sectional perspective view of the bracket being fully secured to the flashing.

FIGS. 11-15 illustrate the steps used to join the bracket 100 to the receiver 315 and install the flashing 300 to the roof 600. FIG. 11 shows an exploded view of the combination flashing and bracket assembly with flashing 300, which is generally a flat, rectangular-shaped metallic structure, although other suitable shapes and materials would work as well. The flashing 300 comprises a receiver 315 that is either embedded or secured with the flashing 300 along a raised base 310 on the flashing 300. A bolt 125 is used to secure the flashing 300 to the roof 600 by inserting the bolt 125 through the opening 340. The bracket 100 is also shown. FIG. 12 shows the bracket 100 secured to the receiver 315 and the flashing 300 presumably secured to the roof 600 as the bolt 125 has been inserted through the opening 340. FIG. 13 shows the first step to assembling the flashing 300 to the roof 600. One side of the flashing 300 is typically inserted between the shingles 615 on the roof 600. FIG. 14 illustrates the next step, which is to secure the flashing 300 to the roof 600 by inserting the bolt 125 through the opening 340 of the receiver 315 and rotating the bolt 125 until it is fully tightened. FIG. 15 shows the final step, which is to engage the bracket 100 with the receiver 315 and rotate the bracket 100 clockwise along the threaded portion 320 until it is locked into place, which is apparent when the bumps 165 snap into place on the snap tabs 330 or when the circlip 168 engages the receiver 315 causing a tactile snap to occur and making an audible sound. FIG. 16 shows a sectional view of the fully assembled bracket/flashing combination where the internal elements can be seen.

Figure 17:
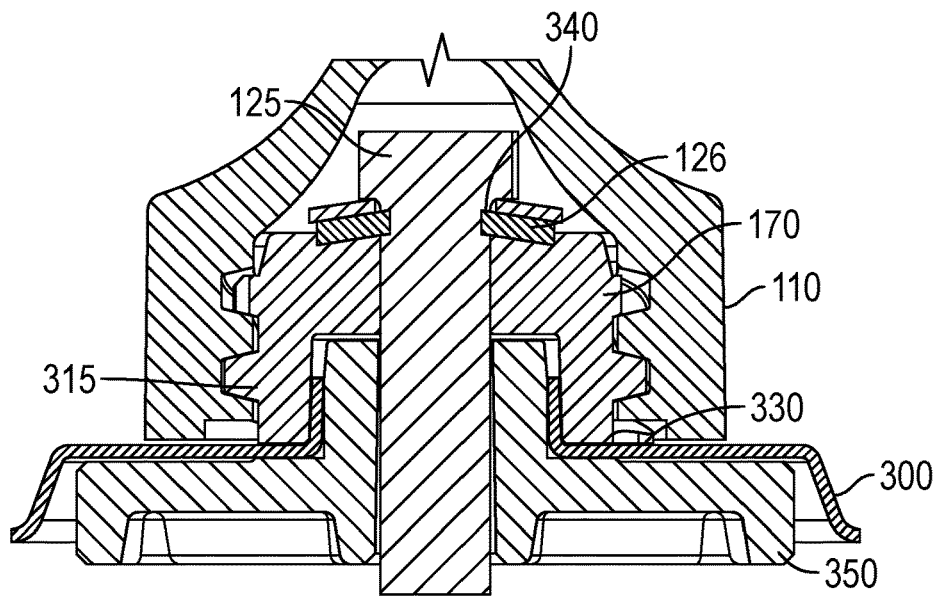
FIG. 17 illustrates a side cross-sectional view of the bracket and flashing in the secured position including the sealing details.
Figure 18:
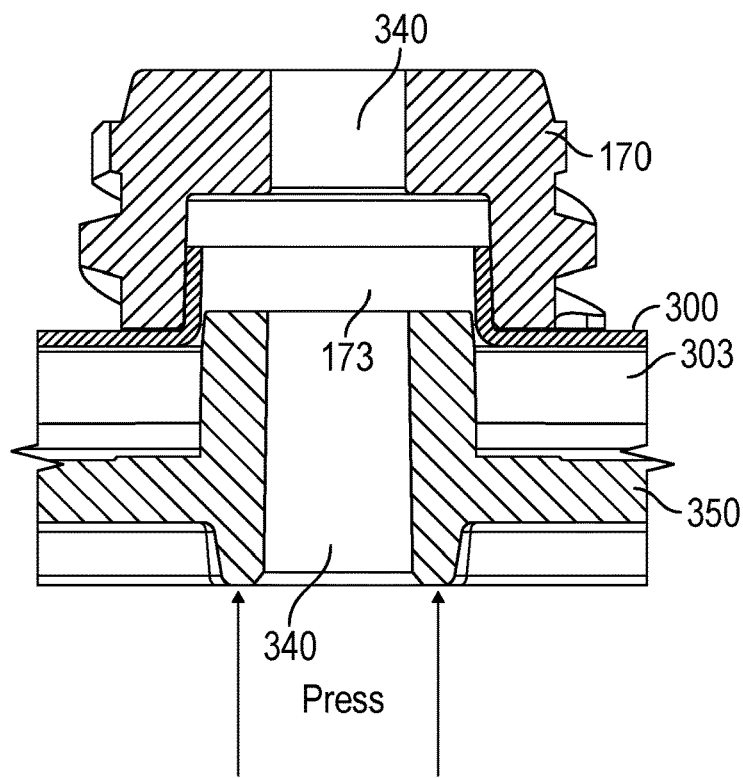
FIG. 18 illustrates a side cross-sectional view of the first step in the manufacturing process of the flashing showing the how the flashing is sealed by press fitting.
Figure 19:
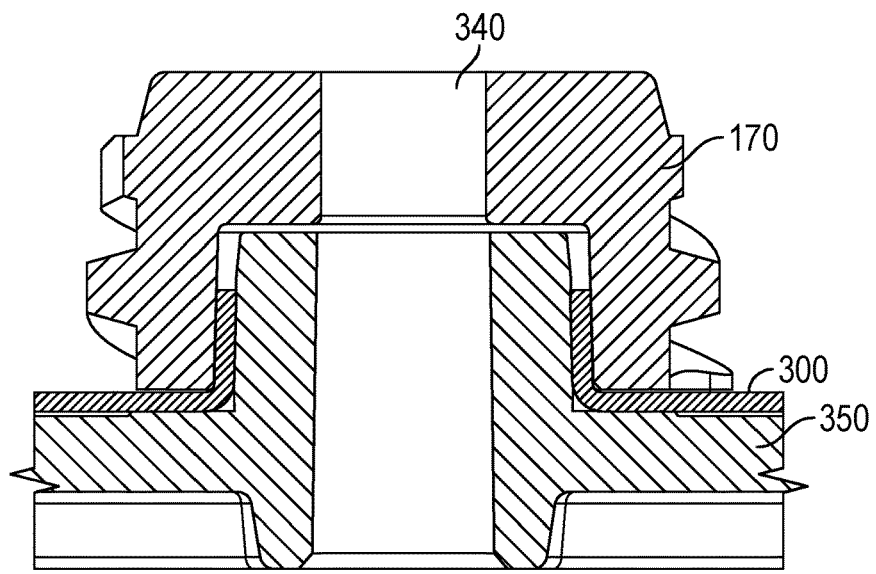
FIG. 19 illustrates a side cross-sectional view of the second step in the press-fitting process showing a sealed flashing.

FIG. 17 illustrates a cross-sectional side view showing how the fully assembled flashing combination beneath the capped bracket 100 is sealed to prevent moisture from entering the roof 600. A load distribution plate 350 is provided between the flashing 300 and the roof 600. The load distribution plate 350 is typically made of a metallic material, but any suitable material capable of distributing the load from the solar array to the roof would be sufficient. The load distribution plate 350 also is tightly joined to the flashing 300 at its raised base 310, and receiver 315. The interference fit between these slightly tapered parts creates a watertight seal. A washer 126 is also provided between the top of the bolt 125 and the top of the receiver 315 to further prevent moisture from seeping inside the opening 340 of the receiver 315. FIGS. 18 and 19 show an exemplary method for making the receiver 315 water tight by using a press fit manufacturing process. As shown in FIG. 18, prior to press fitting, the load distribution plate 350 has not yet been inserted into the receiver 315 as evidenced by a first gap 173 and a second gap 303. The opening in the flashing 300 is supported and sealed by pressing the receiver 315 and load distribution plate 350 together with the flashing 300 and raised base 310 in between the distribution plate 350 becomes fully inserted into the gaps 173 and 303 to seal off any available internal openings as shown in FIG. 19.

Figure 20:
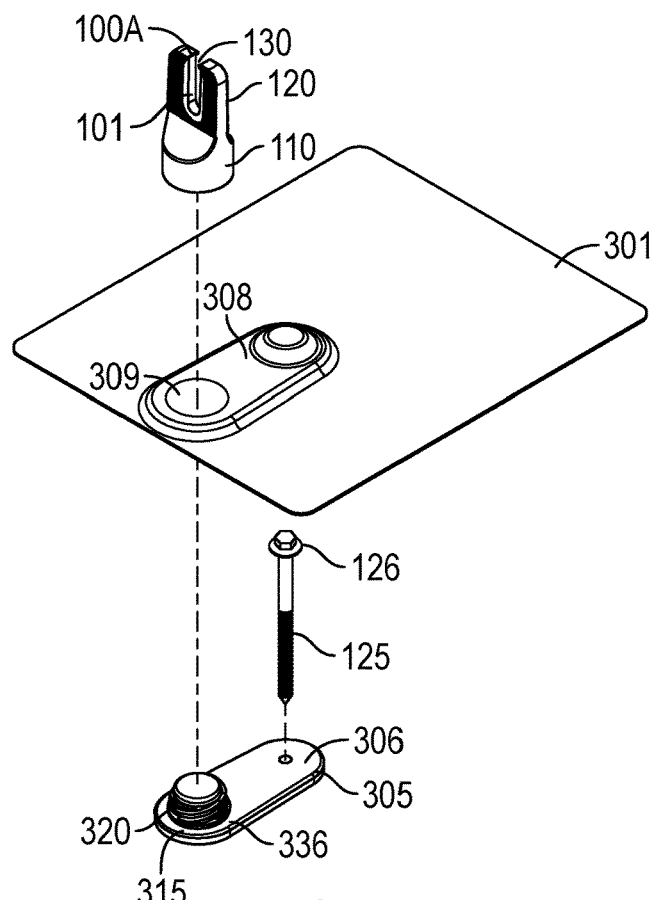
FIG. 20 illustrates an exploded view of an alternate exemplary embodiment with a base plate and receiver that is separate from the flashing.
Figure 21:
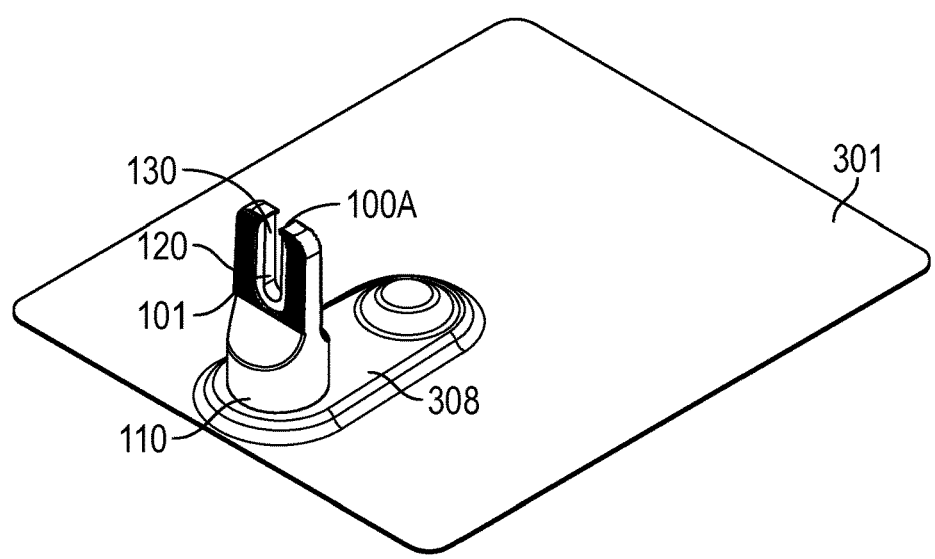
FIG. 21 illustrates a perspective view of a fully assembled bracket and flashing of the embodiment shown in FIG. 20.

FIG. 20 illustrates an exploded view of another exemplary alternate embodiment of the invention. In this embodiment, a separate flashing 301 and a foundation 305 is shown and can provide a more simplified installation when the solar panel array is being assembled by multiple installers who carry out each step in an "assembly line" type of process. This embodiment also moves the roof penetration point so it is upward on the roof from the aperture 309 in the flashing 300. This prevents water damage and leakage. The foundation 305 includes a hole 306 for receiving the bolt 125 on one end with the receiver 315 on the other end. A washer 126, which may be a bonded washer, is included between the receiver 315 and the bolt 125 to provide a seal over the hole 306 to prevent moisture from entering the roof. The flashing 301 includes a raised molding 308 that fits to the contour of the foundation 305 and provides an aperture 309 that allows the receiver 315 to fit through. FIG. 21 shows an assembled version of the embodiment where the bracket 100 is secured to the receiver 315.

Figure 22:
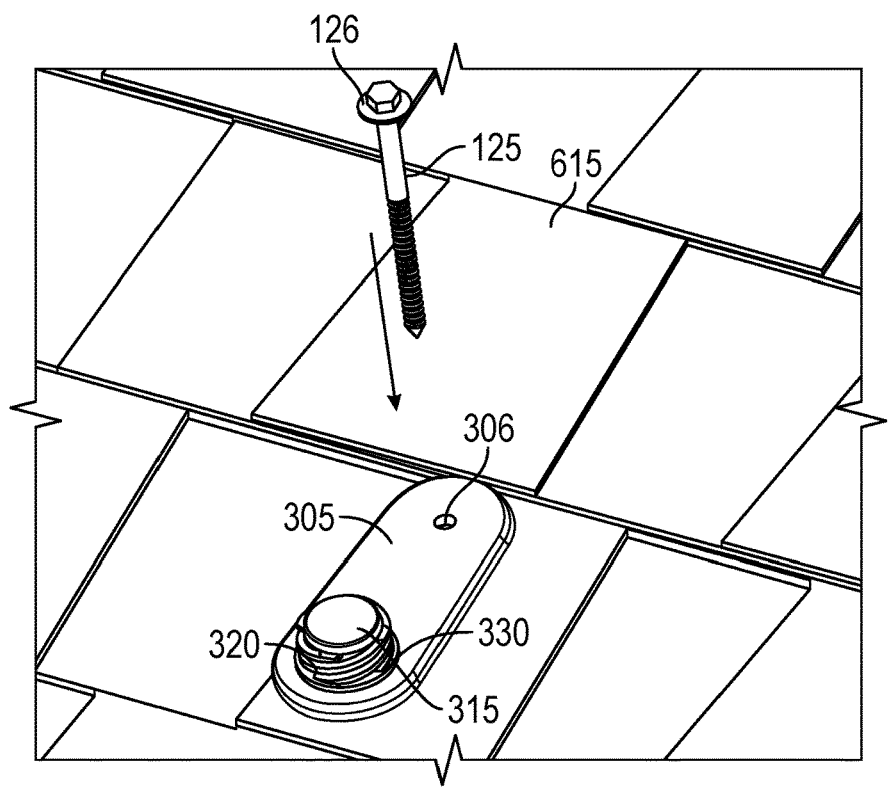
FIG. 22 illustrates a perspective view of the first step in the assembly of the alternate embodiment shown in FIG. 20 whereby base plate is secured to the roof by inserting the screw.
Figure 23:
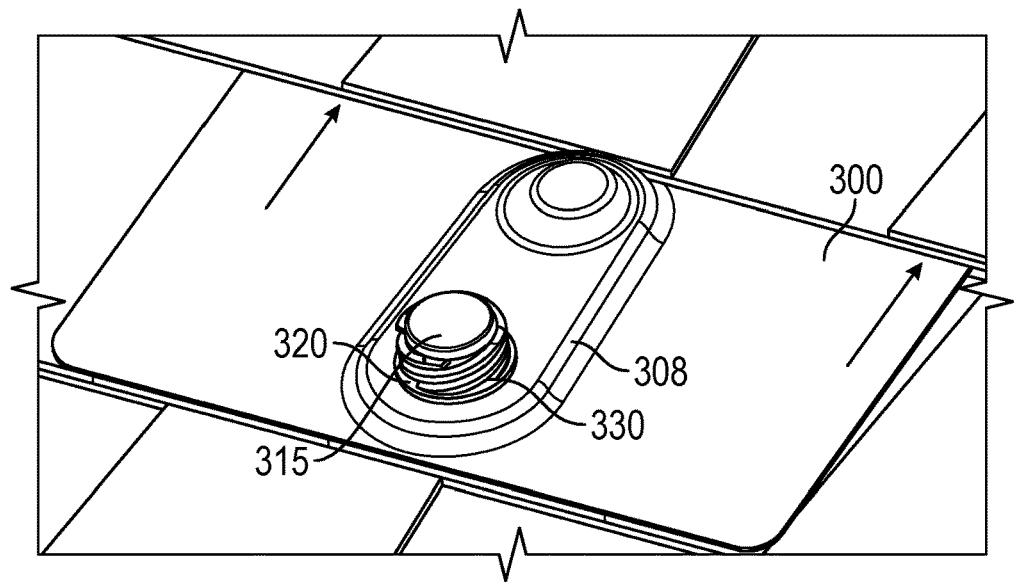
FIG. 23 illustrates a perspective view showing the next step in the assembly process by inserting the flashing between the roof shingles and placing the flashing over the base plate.
Figure 24:
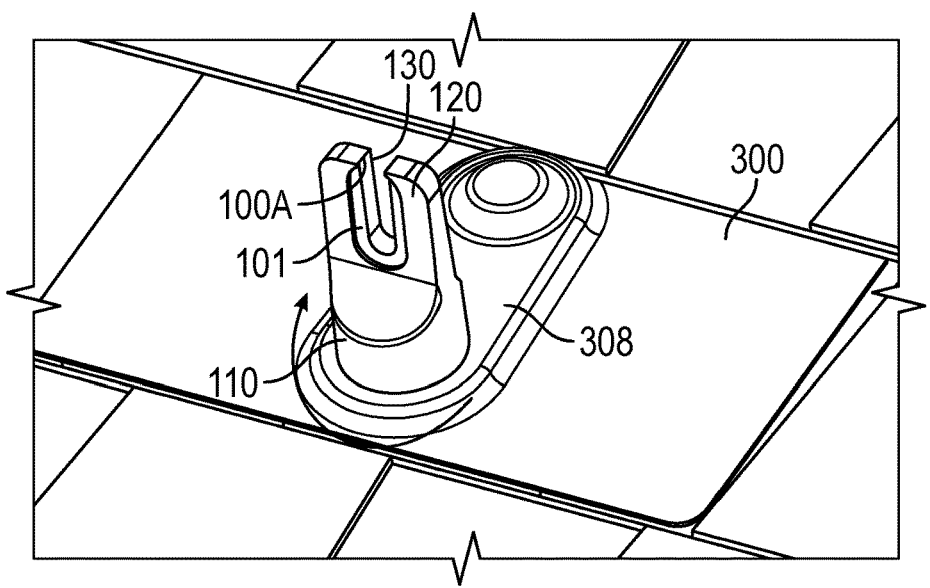
FIG. 24 illustrates a perspective view showing the final step in the assembly process by placing the bracket on the receiver and turning it clockwise until it is secured.
Figure 24A:
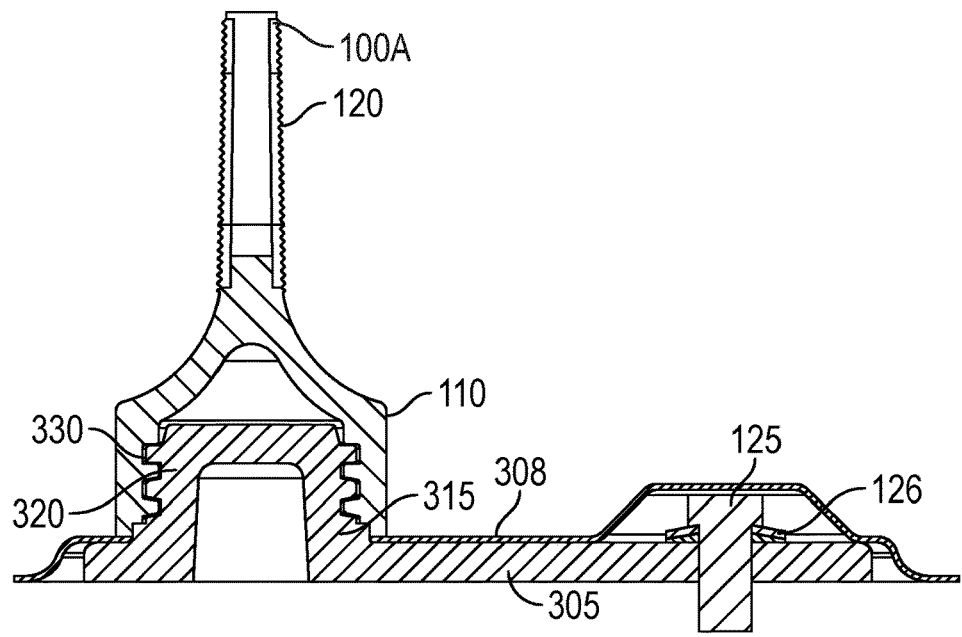
FIG. 24A illustrates a cross-sectional side view of the alternate embodiment shown in FIG. 20.
Figure 24B:
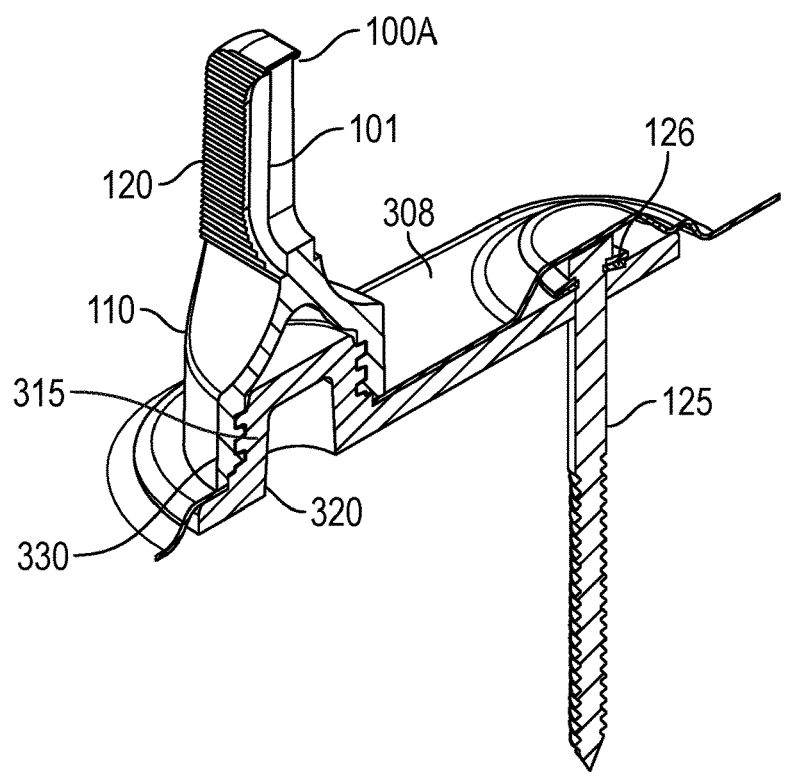
FIG. 24B illustrates a cross-sectional perspective view of the alternate embodiment shown in FIG. 20.

FIG. 22 shows how the embodiment is assembled. First, the foundation 305 is properly aligned to the proper location as shown. The bolt 125 is inserted through hole 306. As shown in FIG. 23, in the next step the flashing 301 is inserted beneath the shingles 615 on one end, and the other end of the flashing 301 is lowered and fitted so that the molding 308 fits on top of the foundation 305 so that the receiver 315 fits through the aperture 309. FIG. 24 shows the final step, which is to secure the bracket 100 to the receiver 315 by engaging the base 110 on the threaded portion 320 of the receiver 315 is fully accessible. The bracket 100 is then rotated clockwise until it is fully tightened and snaps into place as described in the previous embodiment above. FIGS. 24A and 24B illustrate cross-sectional views of the fully assembled embodiment as shown in FIG. 24 from both a side and perspective view respectively.

Figure 24C:
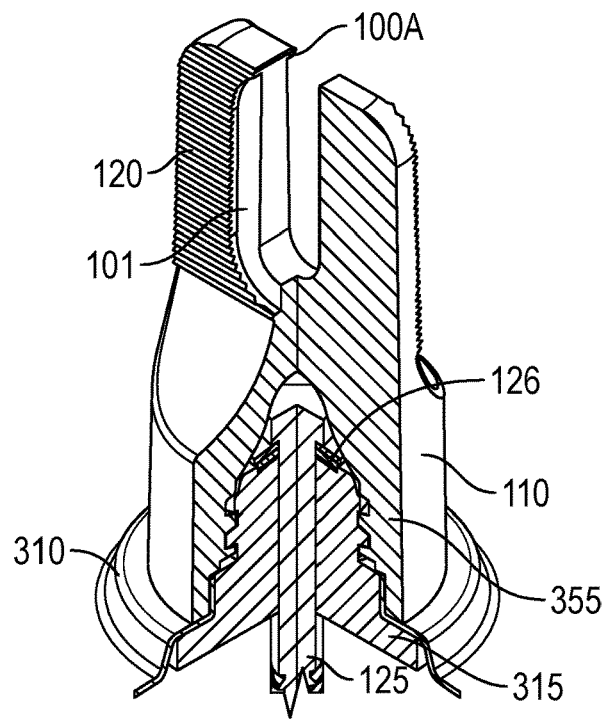
FIG. 24C illustrates a section view of the another alternate exemplary embodiment where the receiver is welded to the flashing.
Figure 24D:
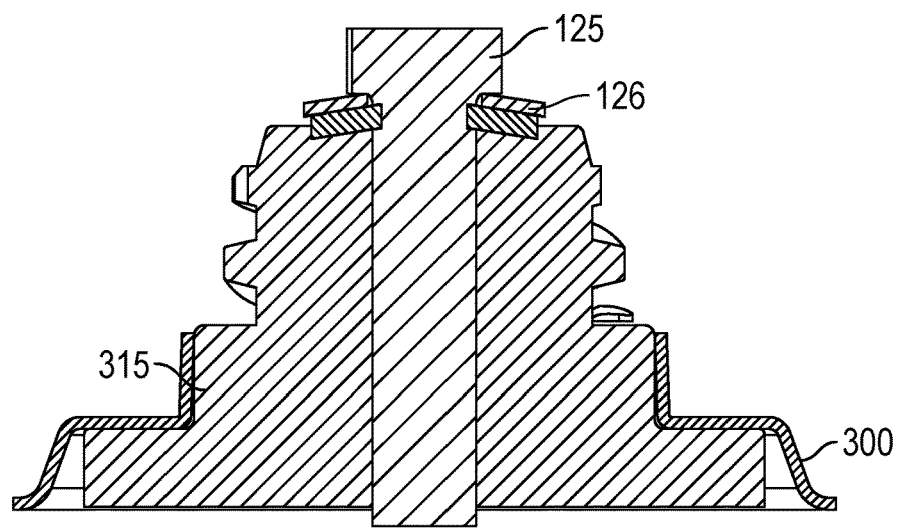
FIG. 24D illustrates a side cross-sectional view of the receiver and flashing in FIG. 24C in the secured position including the sealing details.
Figure 24E:
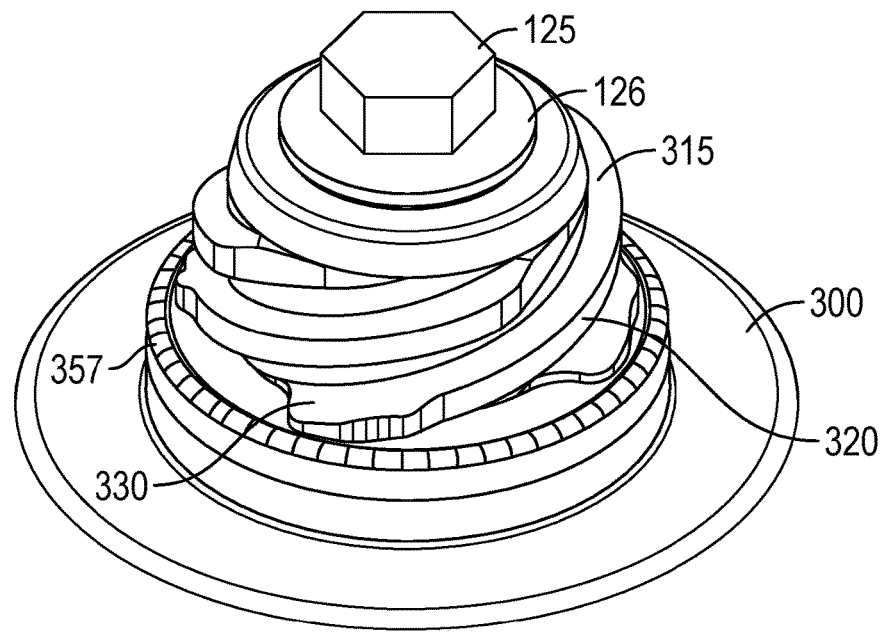
FIG. 24E illustrates a perspective view of the receiver of the embodiment shown in FIG. 24C showing the detail of the welding.

FIG. 24C illustrates a section view of an alternate exemplary embodiment of the invention. In this embodiment, the receiver 315 and load distribution plate 350 are one piece that is welded to the raised base 310 of the flashing 300. The embodiment is installed using the same steps as the embodiment described in FIGS. 11-15. In this embodiment, the receiver 315 is fit through the flashing 300 as shown in the cross-sectional side view of FIG. 24D so that the base 310 is sealed to the receiver 315 using, for example, a weld 357 such as a laser weld, during the manufacturing process as shown in the perspective view of FIG. 24E.

Figure 24F:
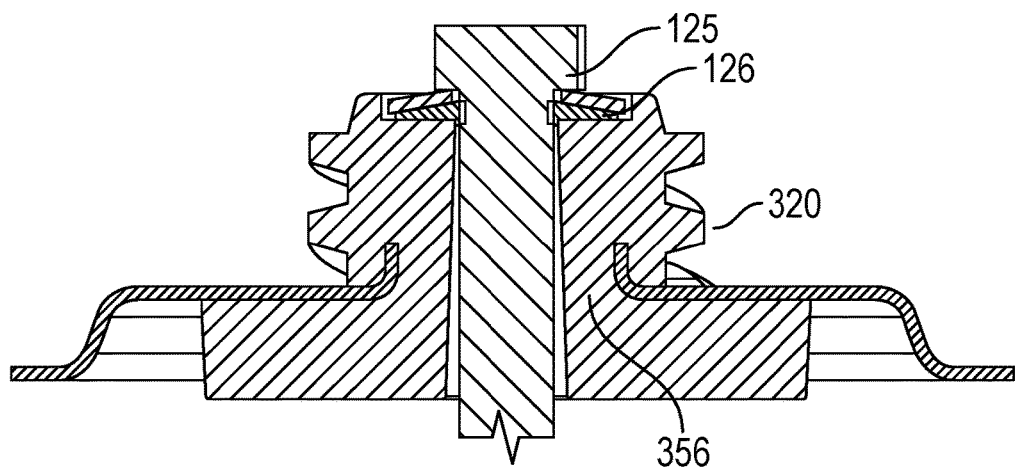
FIG. 24F illustrates a side cross-sectional view of an alternate embodiment of the sealed flashing with a combination receiver/load distribution plate that is injection molded or cast around the opening of the flashing to create a seal.

FIG. 24F shows another alternate exemplary embodiment of the present invention. In this embodiment, the receiver and load distribution plate combination 356 is typically a polymer that is molded directly onto the flashing 300. The embodiment is installed using the same steps as the embodiment described in FIGS. 11-15. The cross-sectional side view provides a view the internal aspects of the embodiment. The molding of the combination 356 to flashing 300 creates a single part with a raised and supported seal that replaces the need for a pressed seal in FIGS. 18-19 or a welded seal in FIGS. 24D-24E.

Figure 25:
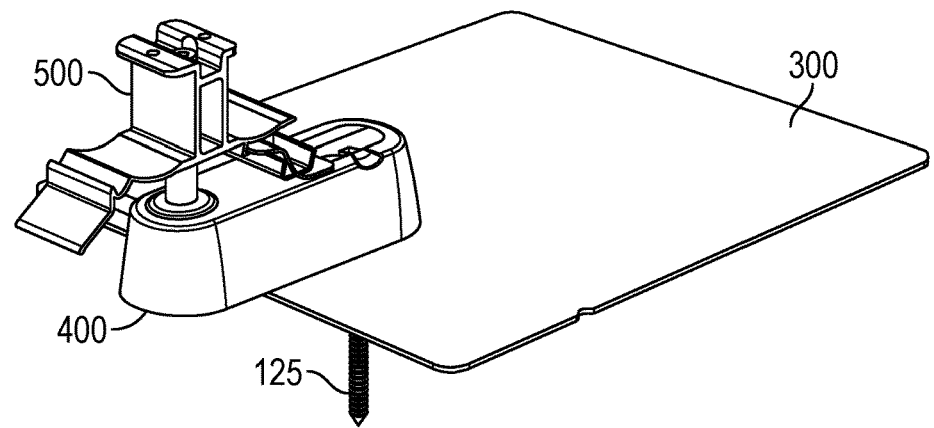
FIG. 25 illustrates a perspective view showing a pivot mount being secured to the rail less sealing embodiment shown in FIG. 26.
Figure 26:
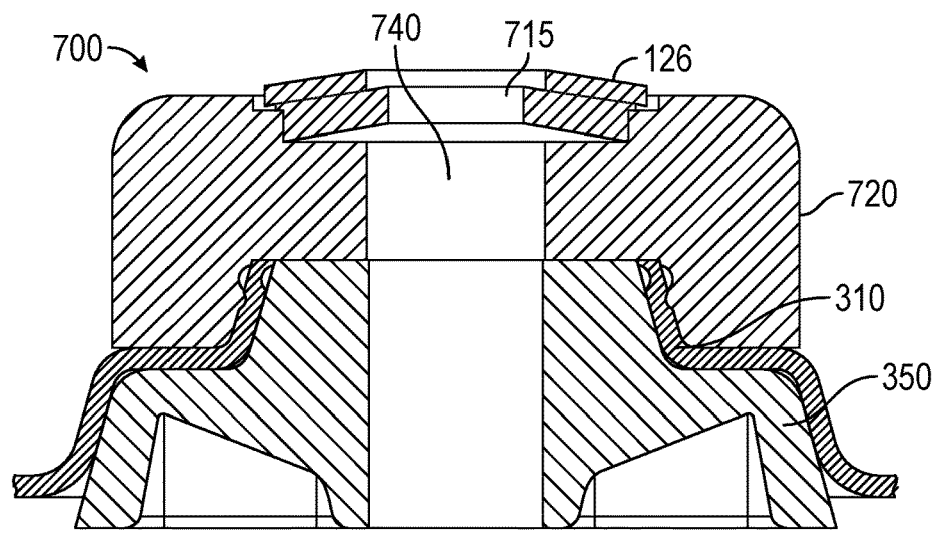
FIG. 26 illustrates a cross-sectional side view of a sealing embodiment with an alternate receiver that is not threaded.
Figure 27:
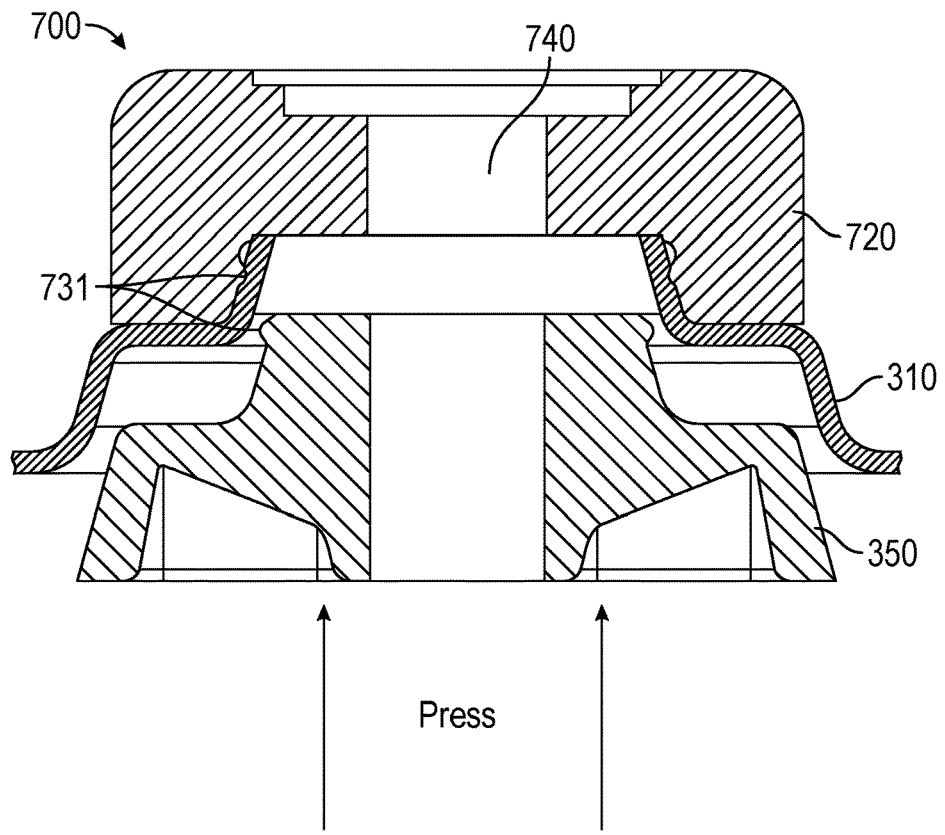
FIG. 27 illustrates a cross-sectional side view of the rail-less sealing embodiment being assembled by press fitting the elements together.
Figure 28:
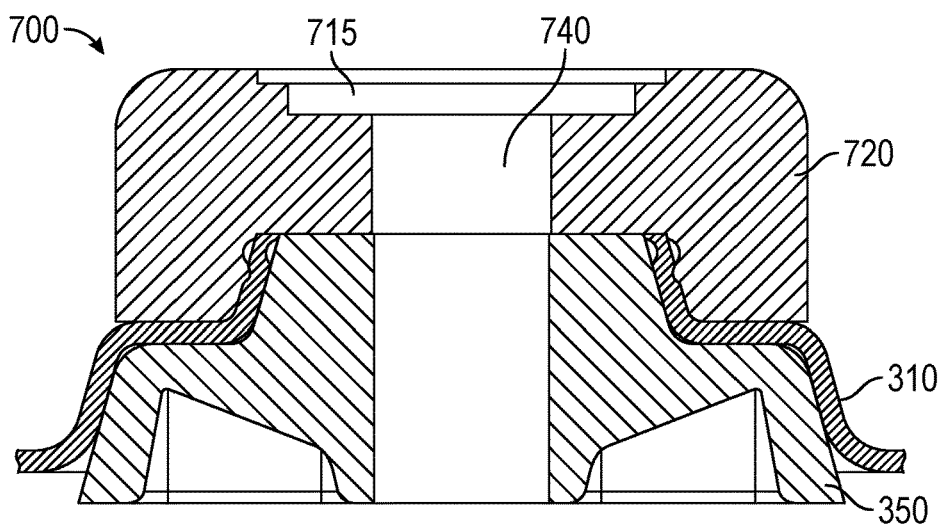
FIG. 28 is a cross-sectional side view of the finished rail-less sealing embodiment.
Figure 29:
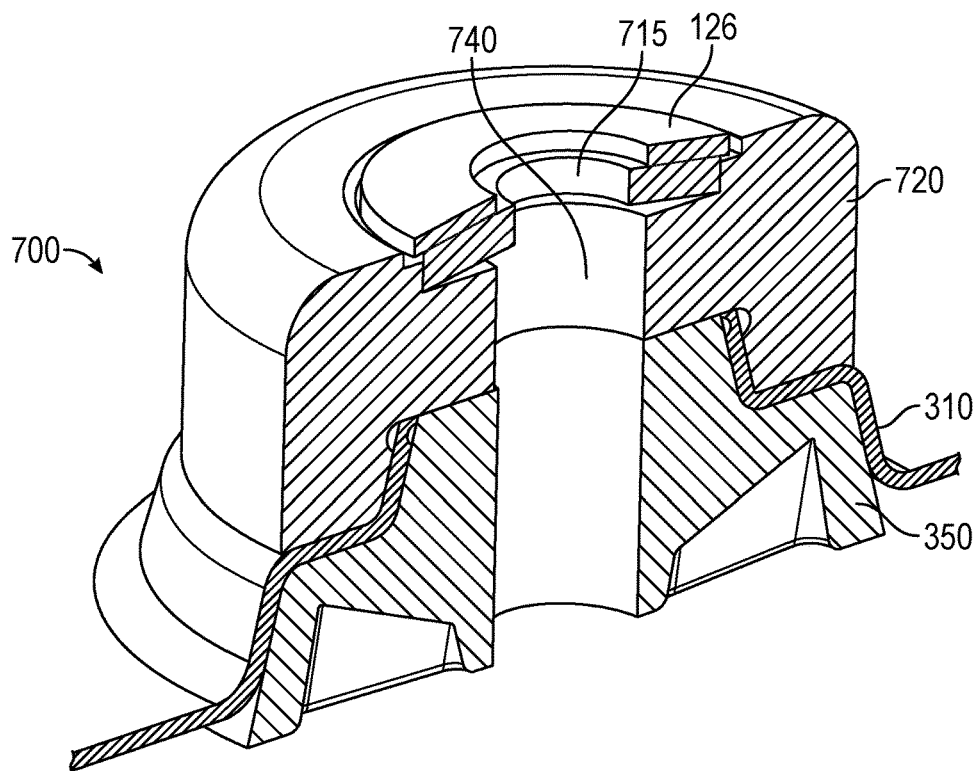
FIG. 29 is a perspective section view of the rail-less sealing embodiment shown in FIG. 28 with and inset bonding washer.
Figure 30:
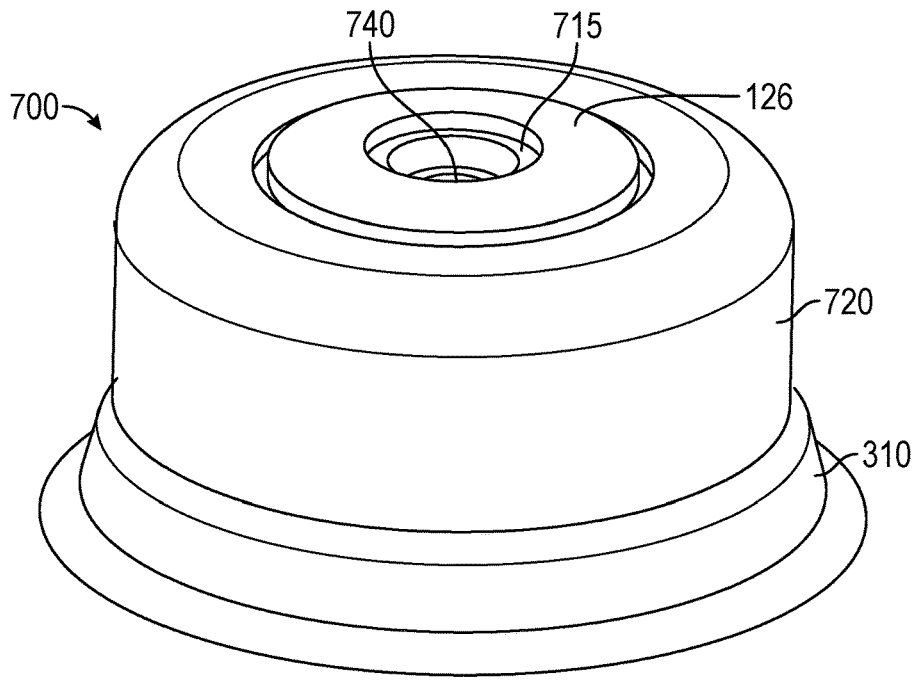
FIG. 30 is a perspective view of the rail-less sealing embodiment shown in FIG. 29.

FIG. 25 illustrates another alternate exemplary embodiment of the present invention. The figure shows a rail-less pivot mount 400 with the solar panel module support 500 that is fully assembled to the flashing 300, which is assembled to a roof 600. The pivot mount 400 is coupled to a sealing 700 that is shown in FIG. 26. The sealing 700 is an alternate exemplary embodiment of the assembled flashing combination as shown in FIG. 19 and is typically the cylindrically shaped member that a rail-less pivot mount is coupled to as discussed below. FIG. 26 illustrates a cross-sectional side view of the sealing 700. The sealing 700 includes a generally cylindrical-shaped fitting 720, a load distribution plate 350. A bonded washer 126 is shown as an added weather barrier that includes an opening 715. The washer 126, the fitting 720, and the distribution plate 350 are aligned along a central axis to form a single aperture 740. FIG. 27 shows a cross-sectional side view that demonstrates how the sealing 700 is manufactured. As shown, the fitting 720, and the distribution plate 350 are all press fit together under compression so that the base 310 of the flashing 300 is sealed between the fitting 720 and the distribution plate 350. The fitting 720 and the distribution plate 350 include tapered portions 731 with pocketed walls so that the upper portion of the base 310 can flow into these areas when the parts are press fit together. FIG. 28 shows a cross-sectional side view of a fully assembled sealing 700 after its components have been press fit. Other suitable techniques to manufacture the sealing 700 could also be used as well. FIG. 29 shows a perspective cross-sectional view of the view in FIG. 28. FIG. 30 shows a perspective view of the outer perimeter of the sealing 700 that is fully assembled with washer 126 placed into the top opening of the fitting 720.

Figure 31:
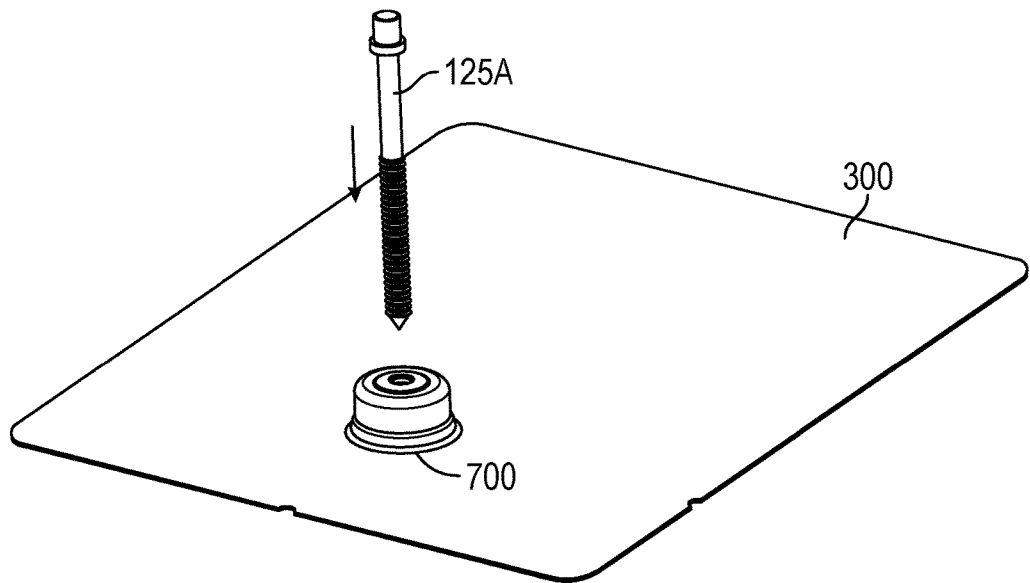
FIG. 31 is a perspective exploded view of the first step in installing the rail-less sealing embodiment shown in FIG. 30 to a roof by using a screw.
Figure 32:
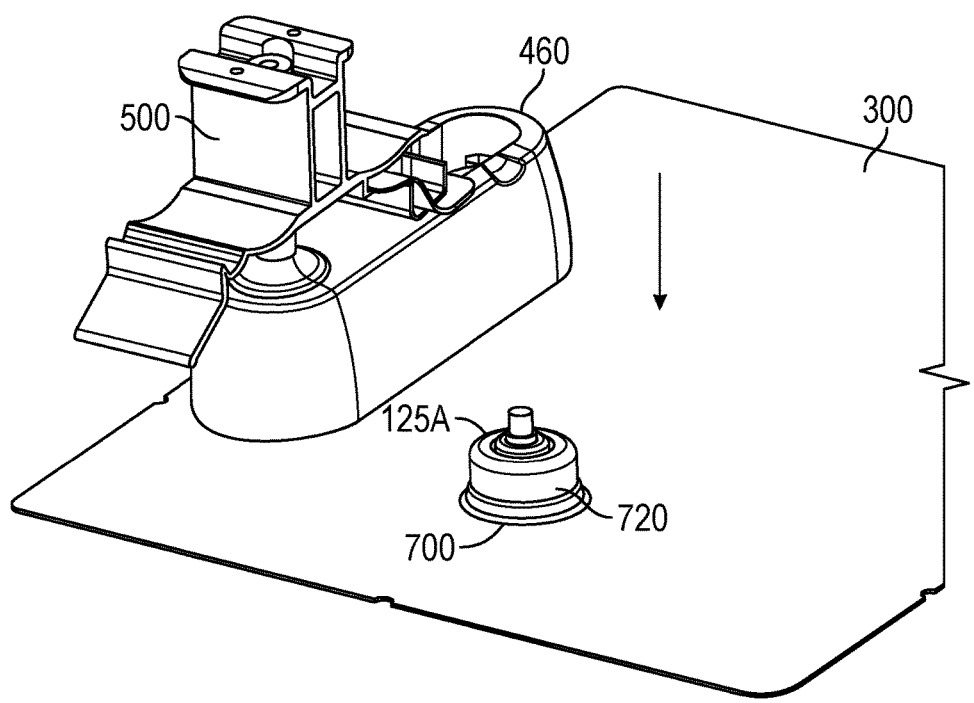
FIG. 32 is a perspective view of the second step in securing the pivot mount to the rail-less sealing embodiment shown in FIG. 30.
Figure 33:
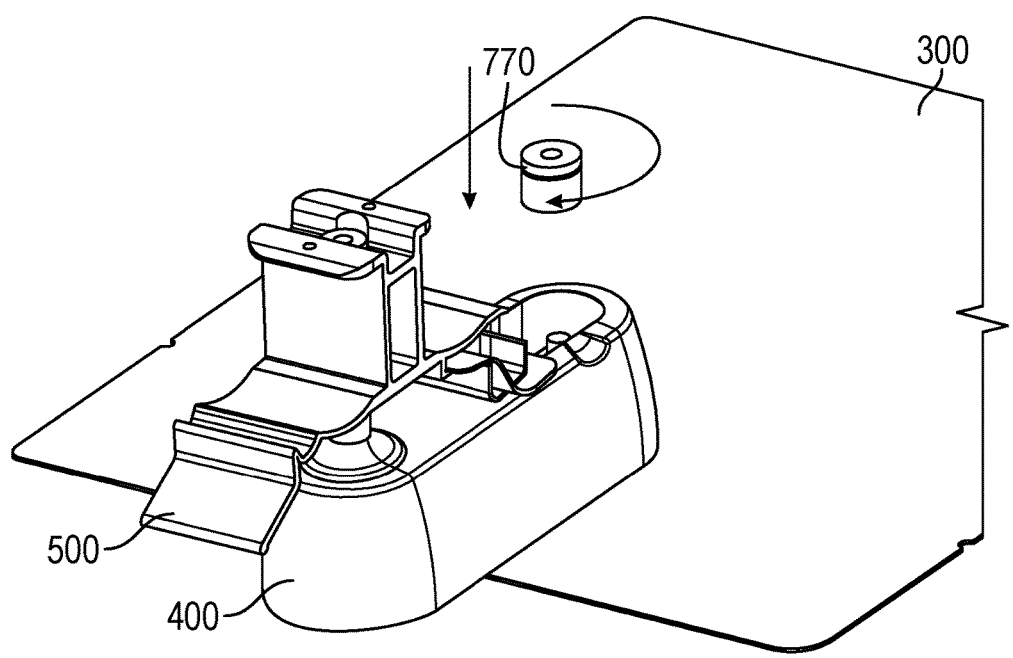
FIG. 33 is a perspective view of the third step in securing the pivot mount to the rail-less sealing embodiment shown in FIG. 30 by using a nut.
Figure 34:
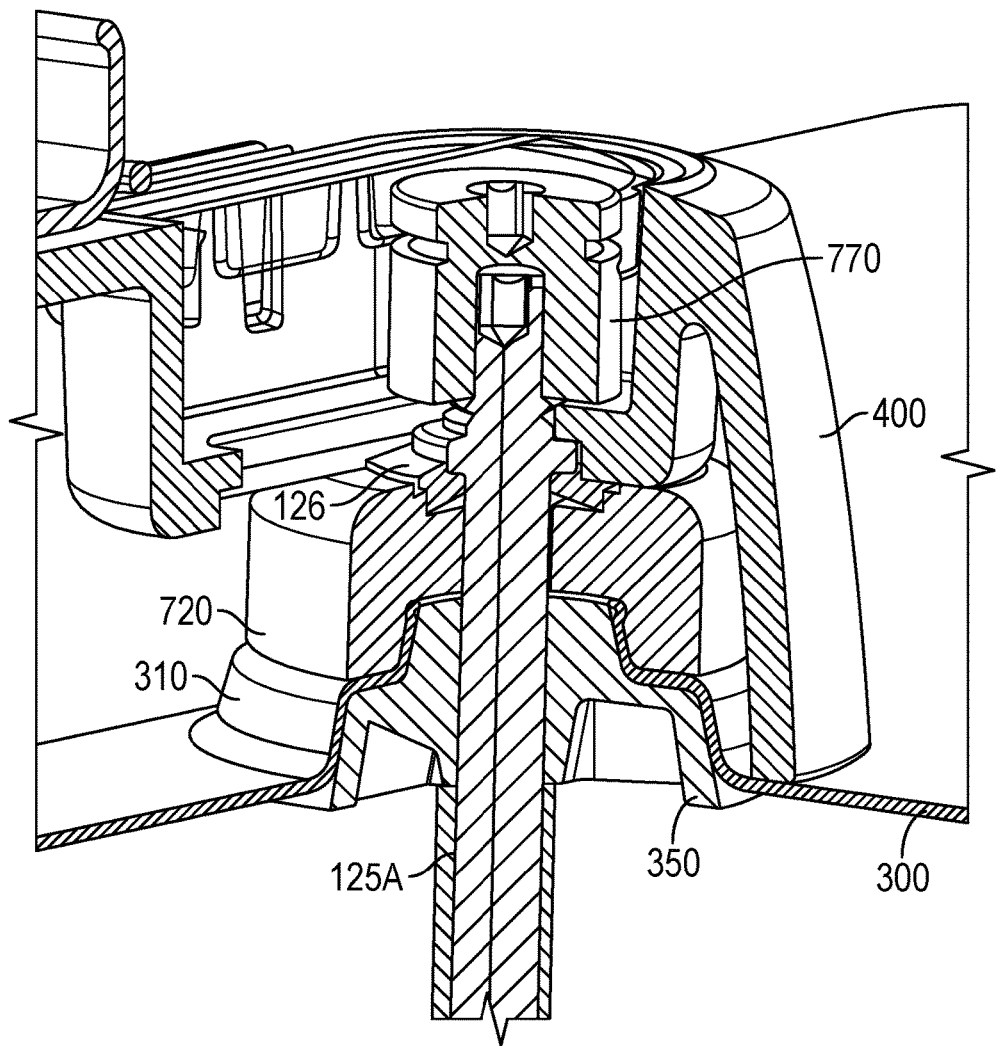
FIG. 34 illustrates a section view of the pivot mount of FIG. 25.

FIG. 31 shows a perspective view of how the flashing 300 is assembled to the roof 600. The hanger bolt 125A with a bonded washer 126, is inserted through the aperture 740 in the sealing 700. Once the flashing 300 is secured to the roof 600, the rear of the pivot mount 400 is lowered on to the fitting 720 as shown in the perspective view of FIG. 32. The pivot mount 400 is then secured to the sealing 700 by using a nut 770. The nut 770 is rotated clockwise on top of the second hanger bolt 125A until it is tightened in place. FIG. 34 shows a sectional view of a fully assembled pivot mount 400 to the sealing 700 that is secured by the utilizing the nut 770. The solar panel module support 500 can then receive a pair of solar panel modules to utilize a rail-less system to install the solar panel array.

What is claimed is:
1. A method of installing an apparatus for supporting a solar array comprising the steps of:
   a. securing a flashing further comprising a receiver to a roof;
   b. coupling a bracket to the receiver by rotating the bracket at a base at a first end of the bracket around the receiver until it is locked into place, the bracket further comprising a guide, wherein the guide comprises:
      i. a substantially U-shaped member that further comprises an aperture within the member;

ii. a recess along a portion of the member that forms the perimeter of the aperture, wherein the recess is configured to allow a bolt to move vertically along the recess; and iii. a first and second end, the first and second ends further comprising a lip such that the recess terminates at each lip of the first and second ends; the lips protruding inward toward each other and are configured to prevent the bolt from escaping from the aperture c. coupling a solar panel rail guide to the guide.

2. The method of claim 1 further comprising the step of coupling a solar panel rail guide to the guide.

3. The method of claim 2 wherein the step of coupling the solar panel rail guide to the guide with a fastener.

4. The method of claim 1 wherein the step of coupling the bracket to the receiver further comprises the step of providing a tactile notification means for indicating that the bracket has been locked into place with the receiver.

5. A mounting bracket for installing a solar panel array to a roof comprising:
   a. base comprising:
      i. an internal opening wherein the internal opening comprises a threaded portion;
   b. a guide comprising:
      i. a substantially U-shaped member wherein the member comprises:
         A. an aperture within the member;
         B. a recess along a portion of the member that forms the perimeter of the aperture, wherein the recess is configured to allow a bolt to move vertically along the recess; and
         C. a first and second end, the first and second ends further comprising a lip such that the recess terminates at each lip of the first and second ends; the lips protruding inward toward each other and are configured to prevent the bolt from escaping from the aperture.

6. The mounting bracket of claim 5 wherein the base is substantially cylindrical.

7. The mounting bracket of claim 5 wherein the member further comprises a plurality of ridges.

8. The mounting bracket of claim 5 wherein the base further comprises a bump for providing a tactile snap when coupled with a receiver on a flashing.

9. The mounting bracket of claim 5 wherein the base further comprises a raised edge for providing a tactile snap when coupled with a receiver on a flashing.

* * * * *